(12) United States Patent
Murata et al.

(10) Patent No.: US 11,707,972 B2
(45) Date of Patent: Jul. 25, 2023

(54) IN-VEHICLE DOOR LATCH STRUCTURE AND VEHICLE

(71) Applicant: TOYOTA JIDOSHA KABUSHIKI KAISHA, Toyota (JP)

(72) Inventors: Soshiro Murata, Toyota (JP); Kazuki Ohtake, Toyota (JP); Hideaki Kanasugi, Miyoshi (JP); Dai Hidaka, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/529,903

(22) Filed: Nov. 18, 2021

(65) Prior Publication Data

US 2022/0242202 A1  Aug. 4, 2022

(30) Foreign Application Priority Data

Feb. 2, 2021  (JP) ................ 2021-015088

(51) Int. Cl.
| | |
|---|---|
| *B60J 5/04* | (2006.01) |
| *E05B 79/04* | (2014.01) |
| *E05B 83/40* | (2014.01) |
| *E05B 85/04* | (2014.01) |
| *B60J 5/06* | (2006.01) |
| *E05B 85/24* | (2014.01) |

(52) U.S. Cl.
CPC ............ *B60J 5/0412* (2013.01); *B60J 5/049* (2013.01); *B60J 5/0477* (2013.01); *B60J 5/0488* (2013.01); *B60J 5/0497* (2013.01); *B60J 5/062* (2013.01); *E05B 79/04* (2013.01); *E05B 83/40* (2013.01); *E05B 85/04* (2013.01); *E05B 85/24* (2013.01)

(58) Field of Classification Search
CPC ........ B60J 5/062; B60J 5/0412; B60J 5/0477; B60J 5/0488; B60J 5/049; B60J 5/0497; B60J 5/06; B60J 5/0493; E05B 79/04; E05B 85/04
USPC .............................................. 296/155, 65.04
See application file for complete search history.

(56) References Cited

U.S. PATENT DOCUMENTS

| | | | | |
|---|---|---|---|---|
| 4,615,558 A | * | 10/1986 | Nakamura ................. | B60J 5/06 |
| | | | | 292/DIG. 3 |
| 2011/0156437 A1 | * | 6/2011 | Kishino ..................... | B60J 5/10 |
| | | | | 296/146.8 |
| 2015/0315825 A1 | * | 11/2015 | Paskonis ............... | E05B 85/045 |
| | | | | 292/195 |

(Continued)

FOREIGN PATENT DOCUMENTS

| | | | | | |
|---|---|---|---|---|---|
| FR | 3031720 A1 | * | 7/2016 | ............. | B62D 25/12 |
| JP | 10-316053 A | | 12/1998 | | |
| JP | 2002-166756 A | | 6/2002 | | |

(Continued)

*Primary Examiner* — Joseph D. Pape
*Assistant Examiner* — Veronica M Shull
(74) *Attorney, Agent, or Firm* — Dinsmore & Shohl LLP

(57) ABSTRACT

A latch structure includes: a door that is changeable between a closed state in which the door covers a door opening provided on a peripheral wall of a vehicle and an opened state in which the door opens the door opening; a floor panel that constitutes a floor surface of an interior space; a door-side engaging portion mounted on the door; and a floor-side engaging portion mounted on the floor panel and engageable with the door-side engaging portion when the door is in the closed state.

14 Claims, 5 Drawing Sheets

(56) References Cited

U.S. PATENT DOCUMENTS

2021/0372173 A1* 12/2021 Okeke ................... E05B 85/045

FOREIGN PATENT DOCUMENTS

| JP | 2016-132329 A | 7/2016 |
| JP | 2020-026213 A | 2/2020 |

* cited by examiner

IN-VEHICLE DOOR LATCH STRUCTURE AND VEHICLE

CROSS-REFERENCE TO RELATED APPLICATION

This application claims priority to Japanese Patent Application No. 2021-015088 filed on Feb. 2, 2021, incorporated herein by reference in its entirety.

BACKGROUND

1. Technical Field

The present specification discloses a latch structure for an in-vehicle door that latches, at a specified closed position, a door that covers a door opening provided on a peripheral wall of a vehicle, in an openable and closable manner, and a vehicle equipped with the latch structure.

2. Description of Related Art

Generally, a peripheral wall of a vehicle is provided with a door opening that communicates with the inside and outside of the vehicle, and a door that covers the door opening in an openable and closable manner. The vehicle is also equipped with a latch structure to latch the door at the closed position.

Japanese Unexamined Patent Application Publication No. 2020-26213 (JP 2020-26213 A) discloses a latch structure for latching a door. The latch structure of JP 2020-26213 A includes a loop-shaped member attached to the lower frame portion of the vehicle body door frame, and a latch provided near the lower end of the door. The latch is a hook-shaped member that is rotatable and can be engaged with the loop-shaped member.

In recent years, it has been proposed that a floor panel serving as a floor surface of a vehicle is made of a hollow plate material for the purpose of reducing the weight of the vehicle. For example, Japanese Unexamined Patent Application Publication No. 10-316053 (JP 10-316053 A) discloses that a hollow plate material made by extrusion-molding aluminum is used as a floor for a truck. By using the hollow plate material as a floor panel in this way, weight reduction becomes possible.

SUMMARY

However, the floor panel may bend due to the weight of the passengers and the like. The bending of the floor panel may cause abnormal noise, deterioration of the sealing performance of the vehicle cabin, and deterioration of the floor panel itself. Such bending of the floor panel can be reduced by increasing the thickness of the floor panel. However, the increase in the thickness leads to another issue of increased weight of the floor panel. It should be noted that latches in the related art such as those described in JP 2020-26213 A are not provided on the floor panel and do not contribute to the suppression of such bending of the floor panel.

Therefore, in the present specification, a latch structure capable of reducing the bending of the floor panel and a vehicle equipped with the latch structure are disclosed.

A latch structure for an in-vehicle door disclosed in the present specification includes: a door that is changeable between a closed state in which the door covers a door opening provided on a peripheral wall of a vehicle and an opened state in which the door opens the door opening; a floor panel that constitutes a floor surface of an interior space; a door-side engaging portion mounted on the door; and a floor-side engaging portion mounted on the floor panel and engageable with the door-side engaging portion when the door is in the closed state.

With such a configuration, the door is latched on the floor panel. As a result, a part of the load acting on the floor panel is transmitted and distributed to the door, and the movement of the floor panel is restrained by the door, so that the bending of the floor panel is reduced.

In this case, the floor-side engaging portion may include a fixing member having a position that is fixed with respect to the floor panel. The door-side engaging portion may include a movable member that is movable between an engaging position in which the movable member engages with the fixing member and a disengaging position in which the movable member disengages with the fixing member. One of the fixing member and the movable member may include an engaging recessed portion or an engaging hole, and the other may include an engaging protruded portion to be inserted into the engaging recessed portion or the engaging hole.

By using a fixing member instead of a movable member for the floor-side engaging portion provided on the floor panel, the floor-side engaging portion does not interfere with walking of the passengers.

In this case, a recess or an accommodating recessed portion that is a hole penetrating vertically may be provided on an upper surface of the floor panel. At least a part of the floor-side engaging portion may be buried in the accommodating recessed portion.

With such a configuration, the amount of protrusion of the floor-side engaging portion from the upper surface of the floor panel can be significantly reduced, and thus the floor-side engaging portion does not interfere with the walking of the passengers.

In this case, a passage groove that is connected to the accommodating recessed portion and that allows the movable member to pass through may be provided at a position of the floor panel that overlaps with a movement locus of the movable member.

With such a configuration, interference between the movable member and the floor panel can be prevented.

The fixing member may include the engaging recessed portion or the engaging hole. The movable member may include the engaging protruded portion. An installation surface on which the fixing member is installed may be provided with a discharge hole that penetrates vertically and that allows foreign matter to fall out of the vehicle.

Providing such a discharge hole can prevent the foreign matter and water from staying around the engaging recessed portion or the engaging hole, and it is thus possible to effectively prevent the engaging recessed portion or the engaging hole from being blocked by the foreign matter or ice.

The floor panel may include a plurality of panel pieces. Of the plurality of the panel pieces, the panel piece on which the floor-side engaging portion is mounted may be independently removable from the vehicle while the other panel pieces remain attached to the vehicle.

With such a configuration, it is not necessary to remove the entire floor panel during maintenance of the floor-side engaging portion, so that the maintenance of the floor-side engaging portion can be simplified.

The floor panel may include a sealing surface on a peripheral edge. The door may include a sealing member that comes into close contact with the sealing surface and seals a gap between the door and the floor panel in the closed state.

By providing the sealing surface and the sealing member on the floor panel and the door that are connected by the floor-side engaging portion and the door-side engaging portion, the sealing property between the door and the floor panel can be maintained high.

In this case, the vehicle may further include a slope plate that is changeable between a deployed state in which the slope plate extends from a lower end of the door opening toward a road surface, and an accommodated state in which the slope plate is accommodated in an underfloor space below the floor panel. The door may be set to a position and size that secures a movement path of the slope plate when the door is in the closed state and the slope plate is changed from the accommodated state to the deployed state or from the deployed state to the accommodated state. The slope plate may be changeable from the accommodated state to the deployed state or from the deployed state to the accommodated state while the door is in the closed state.

With such a configuration, the door can be kept closed until the slope plate is completely deployed or accommodated, and thus the ease of getting on and off at the time of getting on and off the vehicle can be further improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
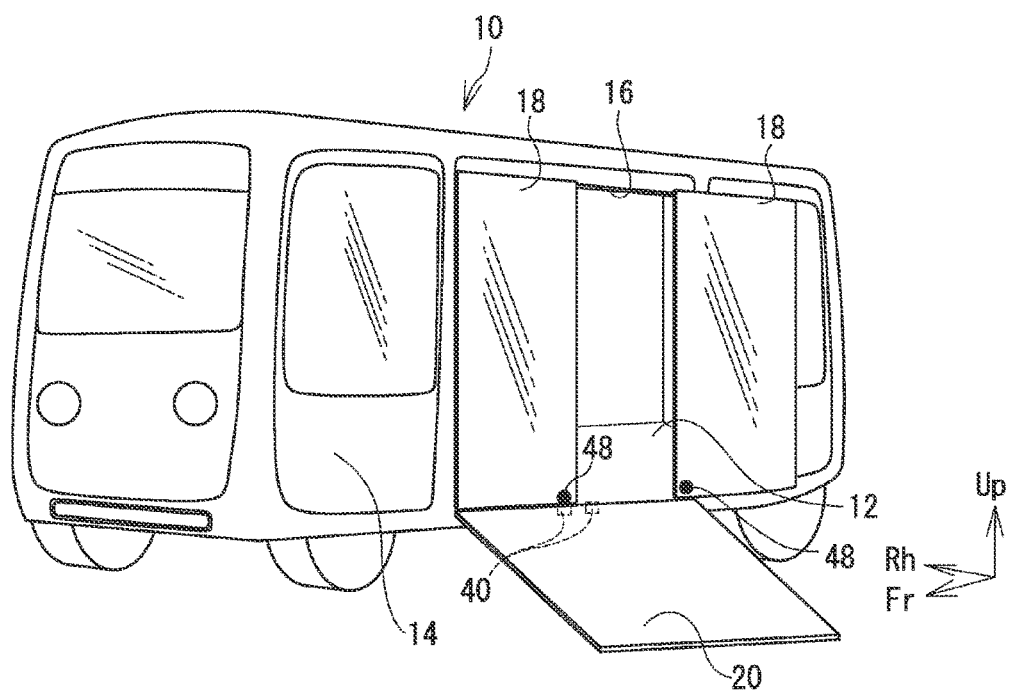
FIG. 1 is a perspective view of a vehicle equipped with a latch structure of a door.
Figure 2:
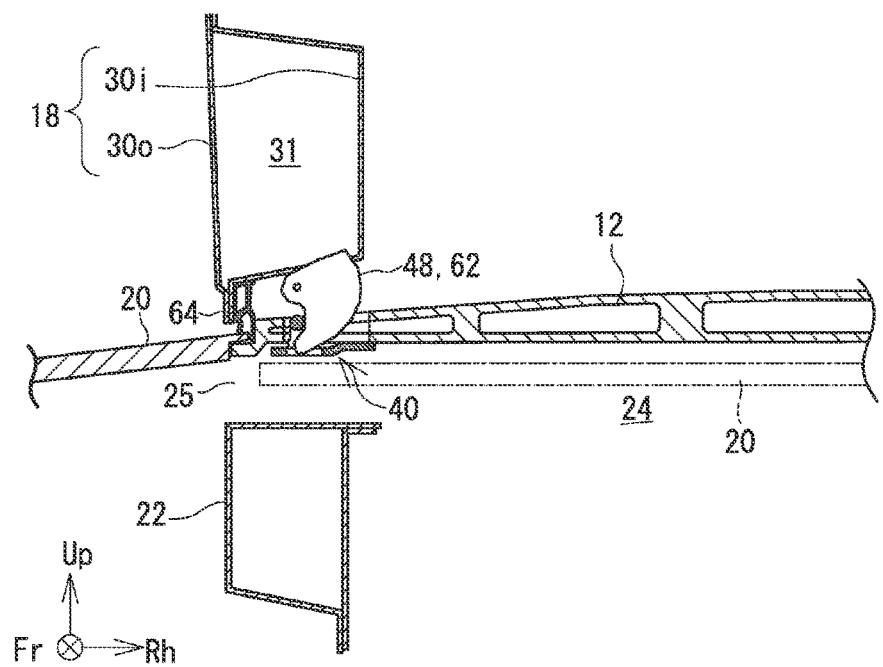
FIG. 2 is a sectional view of the vicinity of a floor-side engaging portion.
Figure 3:
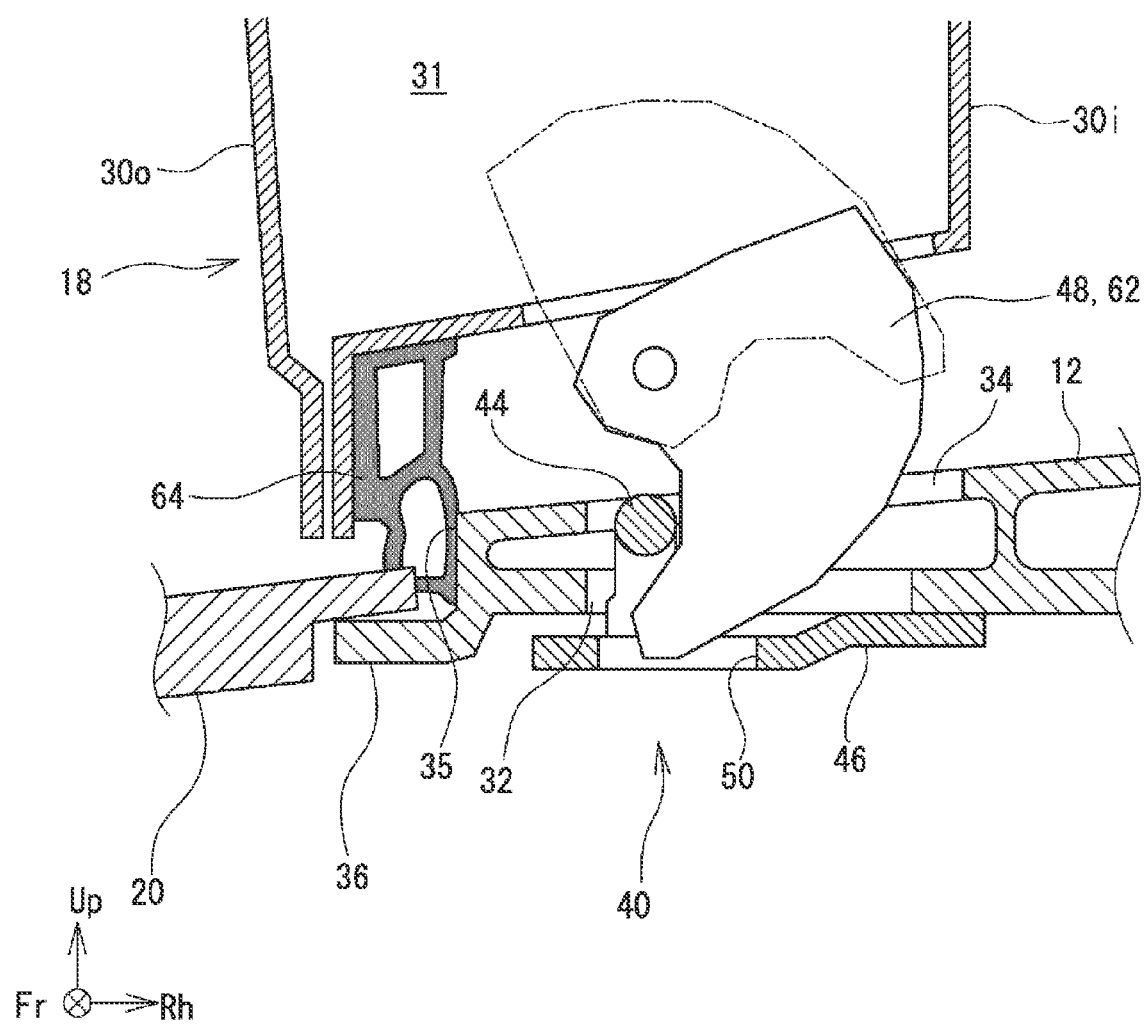
FIG. 3 is a partially enlarged view of FIG. 2.

Hereinafter, a latch structure for an in-vehicle door and a vehicle 10 equipped with the latch structure will be described with reference to the drawings. FIG. 1 is a perspective view of the vehicle 10 equipped with the latch structure. FIG. 2 is a sectional view of the vicinity of a floor-side engaging portion 40, and FIG. 3 is a partially enlarged view of FIG. 2. In each drawing, "Fr", "Up", and "Rh" mean the front, the upper side, and the right side of the vehicle 10, respectively.

As shown in FIG. 1, a door opening 16 for passengers to get on and off the vehicle 10 is provided on a peripheral wall 14, more specifically, a side wall of the vehicle 10. A door 18 covers the door opening 16 so as to be openable and closable. The door 18 can be changed between a closed state in which the door 18 covers the door opening 16 and an opened state in which the door 18 opens the door opening 16. The door 18 of this example opens and closes the door opening 16 by sliding in the front-rear direction along the side wall of the vehicle. More specifically, two doors 18 are disposed side by side in the front-rear direction. The front door 18 closes the door opening 16 by moving to the rear of the vehicle, and the rear door 18 closes the door opening 16 by moving toward the front of the vehicle, that is, in a direction approaching the front door 18. That is, the door 18 of this example is a double sliding door. In the following, the moving direction of the door 18 for closing the door opening 16 will be referred to as a "closing direction".

A floor panel 12 constituting a floor surface in the vehicle is disposed in the vehicle. The floor panel 12 is a substantially flat plate material having an appropriate strength. The door 18 in the closed state is latched on the floor panel 12. In order to perform this latching, the door 18 is provided with a door-side engaging portion 48, and the floor panel 12 is provided with the floor-side engaging portion 40. In FIG. 1, the black circle indicates the position where the door-side engaging portion 48 is disposed, and the square in the dashed line indicates the position where the floor-side engaging portion 40 is disposed. As shown in FIG. 1, the door-side engaging portion 48 is provided near the lower end of the door 18 and at the end portion of the door 18 in the closing direction. Further, the floor-side engaging portion 40 is provided at a position of the floor panel 12 that faces the door-side engaging portion 48 in the closed state. Specific configurations of the door-side engaging portion 48 and the floor-side engaging portion 40 will be described later.

The vehicle 10 is further provided with a slope plate 20 for assisting passengers in a wheelchair in getting on and off the vehicle 10. The slope plate 20 can be changed between an accommodated state and a deployed state. FIG. 1 illustrates the slope plate 20 in the deployed state. As shown in FIG. 1, in the deployed state, the slope plate 20 extends from the lower end of the door opening 16 toward the road surface. The long dashed double-short dashed line in FIG. 2 indicates the slope plate 20 in the accommodated state. As is clear from FIG. 2, in the accommodated state, the slope plate 20 is accommodated in an underfloor space 24 provided below the floor panel 12. The end portion of the underfloor space 24 in the vehicle width direction communicates with the outside of the vehicle, and functions as an entrance/exit 25 that allows the slope plate 20 to move forward and backward.

An electric actuator (not shown) is also disposed in the underfloor space 24 for moving the slope plate 20 to deploy or accommodate the slope plate 20. When the slope plate 20 is changed from the accommodated state to the deployed state, the electric actuator causes the slope plate 20 to pass through the entrance/exit 25 and advance to the outside of the vehicle 10, and then as shown in FIG. 3, places the upper end of the slope plate 20 on a slope connecting portion 36 provided on the peripheral edge of the floor panel 12.

Next, the configuration of each member will be described in more detail. As shown in FIG. 3, the door 18 has an outer panel 30o and an inner panel 30i disposed inside the outer panel 30o in the vehicle width direction. The outer panel 30o and the inner panel 30i are joined to each other at the upper end and the lower end thereof, and a closed internal space 31 is provided between the outer panel 30o and the inner panel 30i.

The height of the lower end of the door 18 is substantially the same as that of the floor panel 12. In other words, the door 18 is set to a position and size that covers neither the entrance/exit 25 nor the slope connecting portion 36 in the closed state. A sealing member 64 is fixed to the lower end of the door 18. In the closed state, the sealing member 64 comes into close contact with a sealing surface 35 set on the floor panel 12 to seal the gap between the door 18 and the floor panel 12.

The door-side engaging portion 48 is provided at a position inside the sealing member 64 in the vehicle width direction. The door-side engaging portion 48 includes a movable hook 62 that can swing around a rotation axis parallel to the vehicle front-rear direction. The movable hook 62 is a movable member that can swing between an engaging position at which the movable hook 62 is inserted inside an arch-shaped member 44 described later, and a disengaging position at which the movable hook 62 is separated from the inside of the arch-shaped member 44. In FIG. 3, the solid line indicates the movable hook 62 at the engaging position, and the long dashed double-short dashed line indicates the movable hook 62 at the disengaging position. At the disengaging position, part or all of the movable hook 62 is accommodated in the internal space 31 of the door 18. A swing mechanism (not shown) for swinging the movable hook 62 is also mounted on the door 18. The configuration of the swing mechanism is not particularly limited, and for example, the swing mechanism may include an urging member that urges the movable hook 62 in the direction toward the engaging position and a wire that transmits the operating force of a user as a force in the direction toward the disengaging position against the urging force of the urging member. As another form, the swing mechanism may include an electric actuator that swings the movable hook 62 in response to reception of an electric signal.

As shown in FIG. 3, the floor panel 12 is a hollow plate material in which a long cavity is formed in the vehicle front-rear direction. The floor panel 12 is formed by extrusion-molding a metal material such as aluminum, for example. By forming the floor panel 12 with a hollow plate material, it is possible to reduce the weight while ensuring sufficient strength.

The slope connecting portion 36 projecting outward in the vehicle width direction is provided at the end portion of the floor panel 12 in the vehicle width direction. The upper end of the slope plate 20 in the deployed state is placed on the slope connecting portion 36. Further, the side surface of the end portion of the floor panel 12 in the vehicle width direction functions as the sealing surface 35 with which the sealing member 64 comes into close contact.

Figure 4:
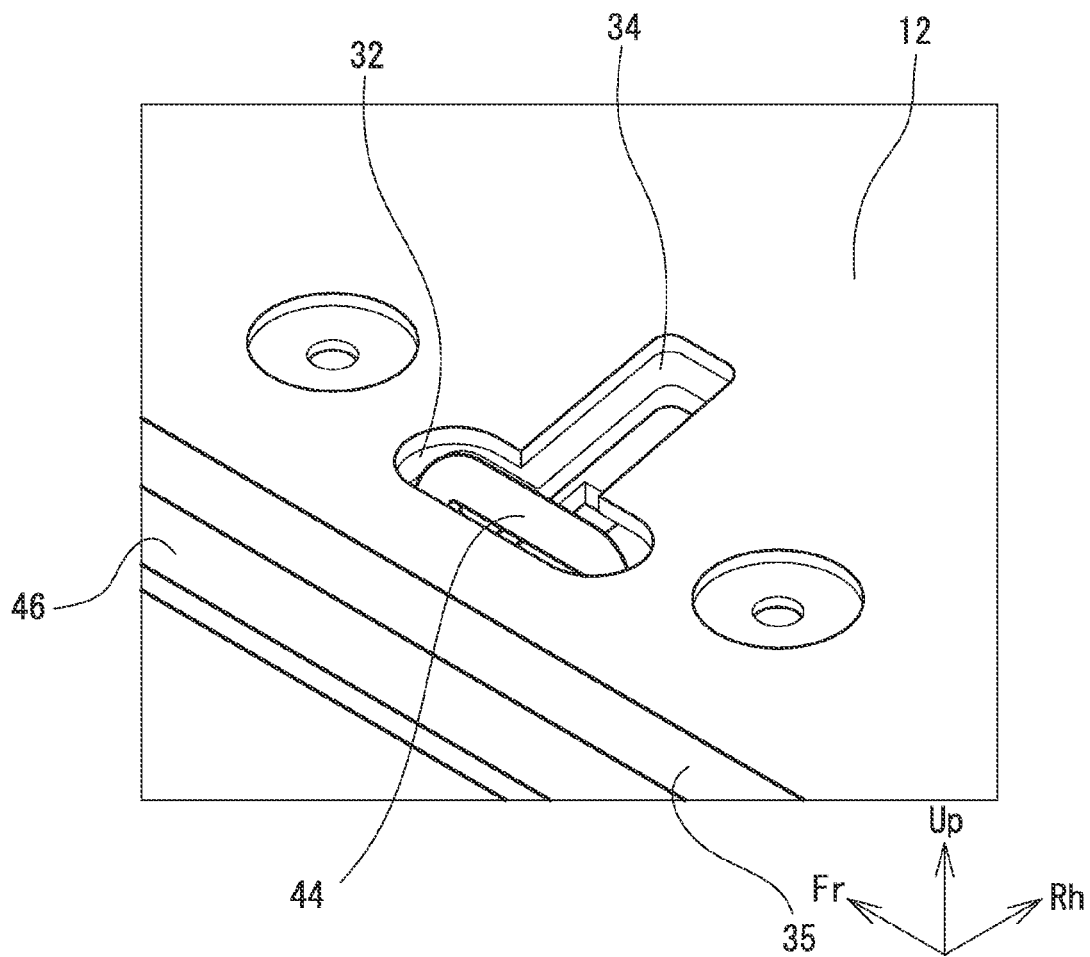
FIG. 4 is a perspective view of the vicinity of the floor-side engaging portion.

The floor-side engaging portion 40 is provided in the floor panel 12 at a position that faces the door-side engaging portion 48 in the vertical direction in the closed state. FIG. 4 is a perspective view of the vicinity of the floor-side engaging portion 40, and FIG. 5 is a perspective view of the floor-side engaging portion 40 alone.

Figure 5:
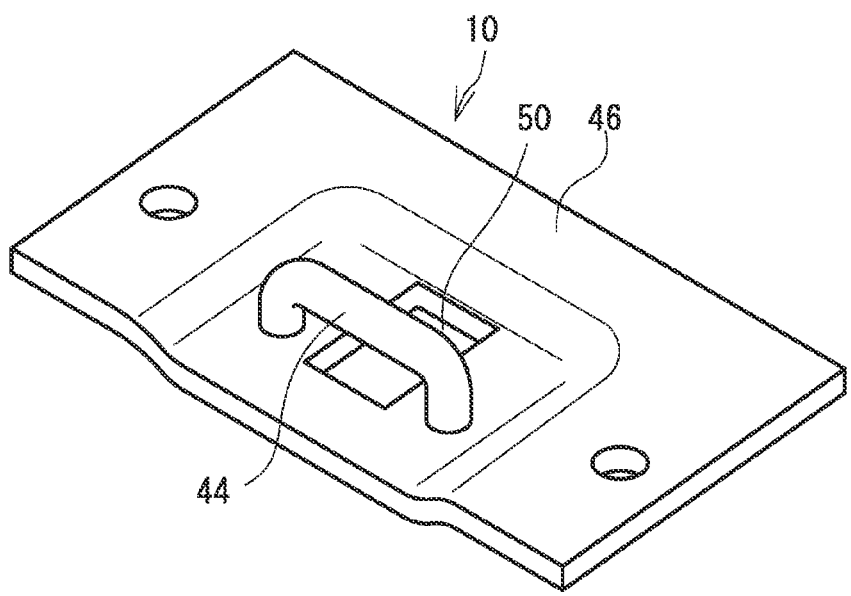
FIG. 5 is a perspective view of the floor-side engaging portion alone.

The floor-side engaging portion 40 includes the arch-shaped member 44 and a fixing plate 46 shown in FIG. 5. The fixing plate 46 is a plate material made of metal or the like. The fixing plate 46 is screwed and fastened to the lower surface of the floor panel 12. The arch-shaped member 44 stands from substantially the center of the fixing plate 46.

The arch-shaped member 44 is a fixing member that stands on the fixing plate 46 and is fixed in position with respect to the floor panel 12. More specifically, the arch-shaped member 44 has a substantially U-shape that opens downward, and forms, with the fixing plate 46, a passage that penetrates in the vehicle width direction. The passage penetrating in the vehicle width direction functions as an engaging hole, and the movable hook 62 functions as an engaging protruded portion to be inserted into the engaging hole (arch-shaped member 44). The fixing plate 46, which is an installation surface on which the arch-shaped member 44 (that is, the fixing member) is installed, is provided with a discharge hole 50 that penetrates vertically and allows foreign matter to fall out of the vehicle.

An accommodating recessed portion 32, which is a through hole for accommodating the arch-shaped member 44, is provided in a portion of the floor panel 12 corresponding to the arch-shaped member 44. The arch-shaped member 44 is inserted into the accommodating recessed portion 32 from below the floor panel 12. Here, the height of the upper end of the arch-shaped member 44 is substantially the same as that of the upper surface of the floor panel 12. As a result, most of the arch-shaped member 44 is buried inside the floor panel 12 with almost no protrusion from the floor panel 12. With such a configuration, the arch-shaped member 44 does not interfere with walking of the passengers.

The floor panel 12 is further provided with a passage groove 34 extending inward in the vehicle width direction from the accommodating recessed portion 32. The passage groove 34 is provided in a portion of the floor panel 12 that overlaps with the movement locus of the door-side engaging portion 48 (that is, the movable member). By providing such a passage groove 34, the door-side engaging portion 48 can move between the disengaging position and the engaging position without interfering with the floor panel 12.

As is clear from the above description, in this example, the engaging portion that engages with the door-side engaging portion 48 (that is, the floor-side engaging portion 40) is mounted on the floor panel 12. In other words, in this example, the door 18 is latched on the floor panel 12. With such a configuration, a part of the load acting on the floor panel 12 can be transmitted and distributed to the door 18 via the engaging portions 40 and 48. Further, according to this example, the floor panel 12 is connected to the door 18, and the floor panel 12 and the door 18 restrain the movement of each other. As a result, the bending of the floor panel 12 can be reduced.

Further, when the door 18 is latched on the floor panel 12, the slope plate 20 can be deployed while the door 18 is closed, and thus the ease of getting on and off by the passengers can be further improved. This will be described in comparison with the related art.

As shown in FIG. 2, the vehicle 10 has a skeleton member called a rocker 22 disposed below the floor panel 12. The rocker 22 is a skeleton member extending in the vehicle front-rear direction. Conventionally, the engaging portion that engages with the door-side engaging portion 48 has often been provided on the rocker 22 instead of the floor panel 12. That is, in the conventional vehicle 10, the door 18 has often been latched on the rocker 22 instead of the floor panel 12.

However, when the door 18 is latched on the rocker 22, the lower end of the door 18 must be located in the vicinity of the rocker 22. In this case, the entrance/exit 25 through which the slope plate 20 moves, and thus a part of the movement path of the slope plate 20 is blocked by the door 18 in the closed state. Therefore, when the door 18 is latched on the rocker 22, the slope plate 20 can be moved only after the door 18 is opened. However, it is not desirable to move the slope plate 20 with the door 18 open, that is, in a state where the passengers can get on and off the vehicle.

However, in this example, as described above, the door 18 is fixed to the floor panel 12, and the door 18 covers neither the entrance/exit 25 nor the slope connecting portion 36. In other words, the door 18 in this example is set to a position and size that does not block the movement path of the slope plate 20, in other words, that secures the movement path in the closed state. Therefore, according to this example, the slope plate 20 can be deployed or accommodated while the door 18 is closed. As a result, according to this example, the door 18 can be kept closed until the slope plate 20 is fully deployed or fully accommodated and the slope plate 20 stops moving.

Further, by latching the door 18 on the floor panel 12, the movement of the floor panel 12 with respect to the door 18 can be suppressed to be smaller than in the case where the door 18 is latched to the rocker 22. Since the movement of the floor panel 12 with respect to the door 18 is small, the movement of the sealing surface 35 provided on the floor panel 12 with respect to the sealing member 64 can be made smaller than that in the case of latching on the rocker 22. By reducing the relative movement between the sealing surface 35 and the sealing member 64, the adhesion between the sealing surface 35 and the sealing member 64 is improved, and the sealing performance can be further improved.

Further, as described above, the discharge hole 50 is provided in the fixing plate 46 at a position directly below the arch-shaped member 44. With such a configuration, even when foreign matter or water enters the passage of the arch-shaped member 44, the foreign matter or water is quickly discharged to the outside of the vehicle from the discharge hole 50. As a result, it is possible to effectively prevent the issue that the passage of the arch-shaped member 44, that is, the engaging hole into which the movable hook 62 enters is closed by a foreign matter.

Figure 6:
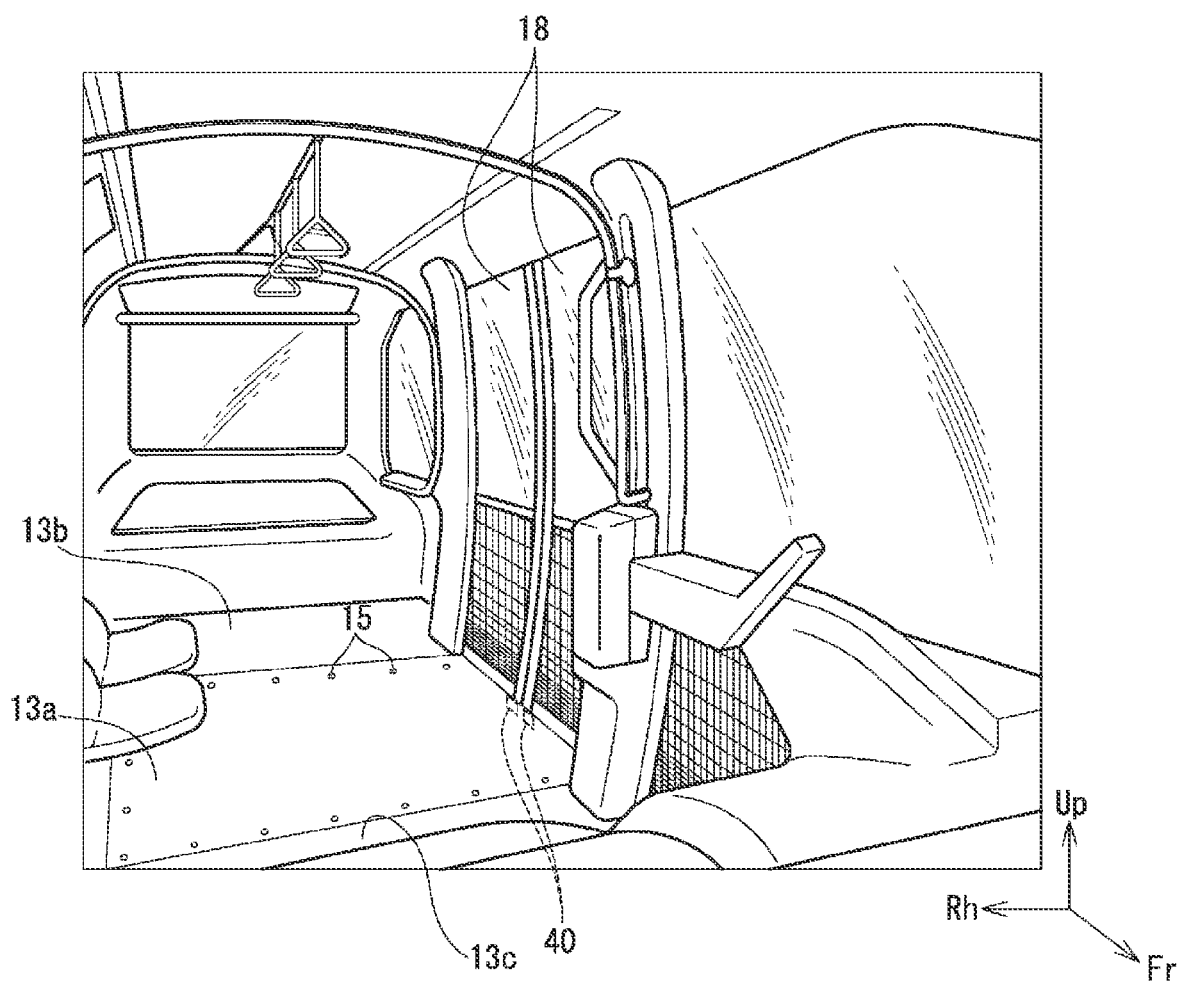
FIG. 6 is a perspective view of the inside of the vehicle.

In this example, the floor panel 12 is composed of a plurality of panel pieces. Of the panel pieces, the panel piece on which the floor-side engaging portion 40 is mounted can be independently removed from the vehicle 10 while the other panel pieces remain attached to the vehicle 10. This will be described with reference to FIG. 6. FIG. 6 is a perspective view of the inside of the vehicle. As shown in FIG. 6, the floor panel 12 has a plurality of panel pieces 13a, 13b, and 13c. Of these, the floor-side engaging portion 40 is mounted on the panel piece 13a extending from the door opening 16 into the vehicle cabin. The panel piece 13a is fastened to the body of the vehicle 10 via a plurality of bolts 15, and can be removed from the vehicle 10 independently while the other panel pieces 13b and 13c remain attached to the vehicle 10. With such a configuration, when maintenance or replacement of the floor-side engaging portion 40 is required, it is not necessary to remove the entire floor panel 12, and thus maintenance of the floor-side engaging portion 40 can be easily performed.

Figure 7:
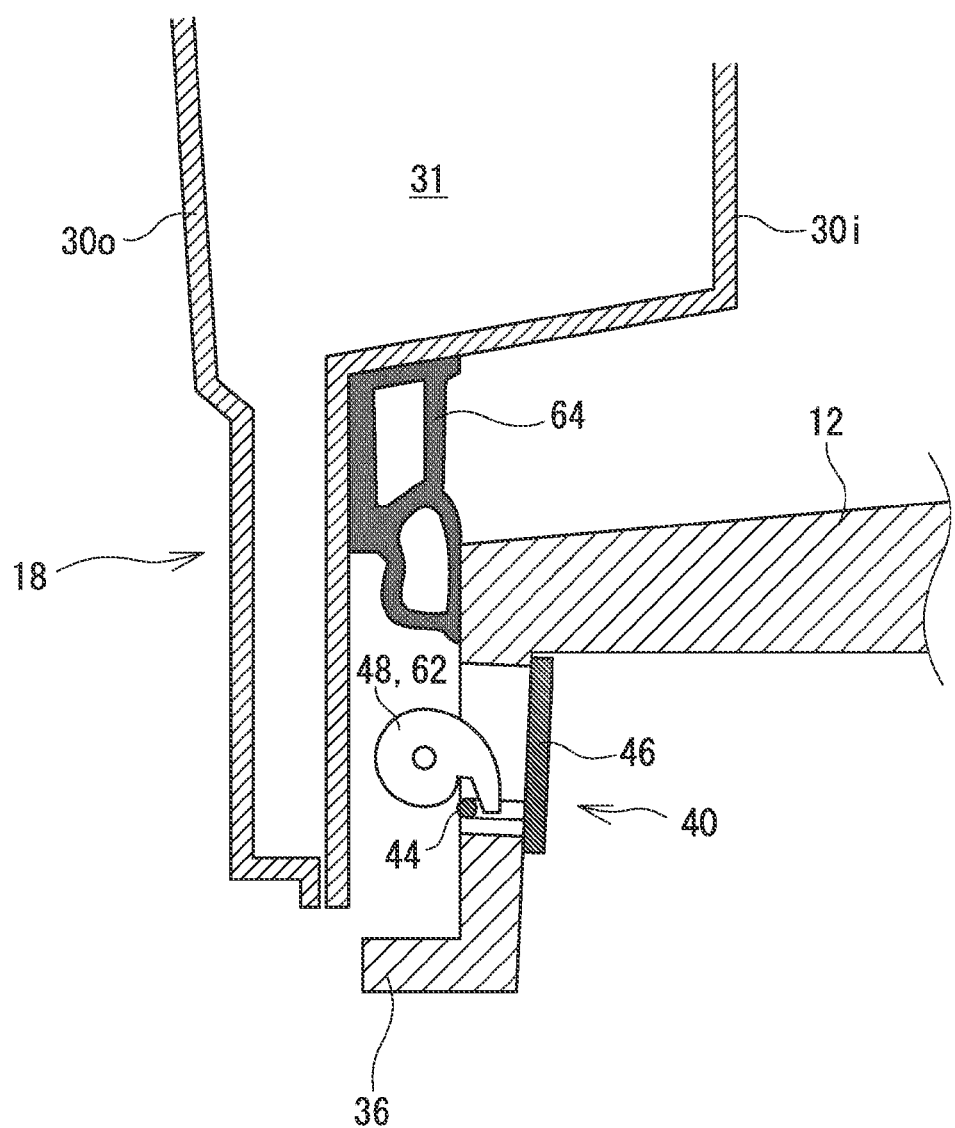
FIG. 7 is a sectional view showing another example of a latch structure of a door.

The configuration described above is an example, and as long as the configuration includes the door 18 that covers the door opening 16 so as to be openable and closable, the floor panel 12, the door-side engaging portion 48 mounted on the door 18, and the floor-side engaging portion 40 mounted on the floor panel 12, other configurations may be modified. For example, in the above description, the arch-shaped member 44 of the floor-side engaging portion 40 stands upward, but as shown in FIG. 7, the arch-shaped member 44 may be disposed on the side surface of the floor panel 12 and may stand outward in the vehicle width direction.

Further, in the above description, the floor panel 12 is provided with the fixing member with the fixed position (that is, the arch-shaped member 44), and the door 18 is provided with the movable member that is movable (that is, the movable hook 62), but this may be reversed. That is, the door-side engaging portion 48 may be a fixing member with a fixed position with respect to the door 18, and the floor-side engaging portion 40 may be a movable member that can be engaged or disengaged with the fixing member by moving with respect to the floor panel 12. Further, in the above description, the floor-side engaging portion 40 is provided with the engaging hole (that is, the passage of the arch-shaped member 44), and the door-side engaging portion 48 is provided with the engaging protruded portion to be inserted into the engaging hole (that is, the movable hook 62), but this may also be reversed. For example, the floor-side engaging portion 40 may be provided with an engaging protruded portion, and the door-side engaging portion 48 may be provided with an engaging hole or an engaging recessed portion into which the engaging protruded portion is inserted.

Further, in the above description, the side door of the vehicle 10 has been exemplified as the door 18. However, the door 18 may be a door other than the side door as long as the door 18 covers the door opening 16 provided in the peripheral wall 14 of the vehicle, in an openable and closable manner. For example, the door 18 may be a back door (also referred to as a "tailgate") provided on the rear end surface of the vehicle 10 instead of the side door. Further, when the vehicle 10 is a container vehicle in which a container is disposed on the floor panel 12 of the loading platform, the door for opening and closing the container may be latched on the floor panel 12. Furthermore, in the above description, the door 18 is a sliding door, but the form of the door 18 may be modified as appropriate. Therefore, the door 18 may be, for example, a swing door that swings around a swing axis extending in the vertical direction, or a flip-up door that swings around a swing axis extending in the horizontal direction.

What is claimed is:

1. A latch structure for an in-vehicle door, the latch structure comprising:
   a door that is changeable between a closed state in which the door covers a door opening provided on a peripheral wall of a vehicle and an opened state in which the door opens the door opening, the door being slidable in the front-rear direction to move between the closed state and the open state;
   a floor panel that constitutes a floor surface of an interior space;
   a door-side engaging portion mounted on the door; and
   a floor-side engaging portion mounted on the floor panel and engageable with the door-side engaging portion when the door is in the closed state.

2. The latch structure according to claim 1, wherein:
   the floor-side engaging portion includes a fixing member having a position that is fixed with respect to the floor panel;
   the door-side engaging portion includes a movable member that is movable between an engaging position in which the movable member engages with the fixing member and a disengaging position in which the movable member disengages with the fixing member; and
   one of the fixing member and the movable member includes an engaging recessed portion or an engaging hole, and the other includes an engaging protruded portion to be inserted into the engaging recessed portion or the engaging hole.

3. The latch structure according to claim 2, wherein:
   a recess or an accommodating recessed portion that is a hole penetrating vertically is provided on an upper surface of the floor panel; and
   at least a part of the floor-side engaging portion is buried in the accommodating recessed portion.

4. The latch structure according to claim 3, wherein a passage groove that is connected to the accommodating recessed portion and that allows the movable member to pass through is provided at a position of the floor panel that overlaps with a movement locus of the movable member.

5. The latch structure according to claim 2, wherein:
the fixing member includes the engaging recessed portion or the engaging hole;
the movable member includes the engaging protruded portion; and
an installation surface on which the fixing member is installed is provided with a discharge hole that penetrates vertically and that allows foreign matter to fall out of the vehicle.

6. The latch structure according to claim 1, wherein:
the floor panel includes a plurality of panel pieces; and
of the plurality of the panel pieces, the panel piece on which the floor-side engaging portion is mounted is independently removable from the vehicle while the other panel pieces remain attached to the vehicle.

7. A vehicle equipped with the latch structure for the in-vehicle door according to claim 1, wherein:
the floor panel includes a sealing surface on a peripheral edge; and
the door includes a sealing member that comes into close contact with the sealing surface and seals a gap between the door and the floor panel in the closed state.

8. The vehicle according to claim 7, further comprising a slope plate that is changeable between a deployed state in which the slope plate extends from a lower end of the door opening toward a road surface, and an accommodated state in which the slope plate is accommodated in an underfloor space below the floor panel, wherein:
the door is set to a position and size that secures a movement path of the slope plate when the door is in the closed state and the slope plate is changed from the accommodated state to the deployed state or from the deployed state to the accommodated state; and
the slope plate is changeable from the accommodated state to the deployed state or from the deployed state to the accommodated state while the door is in the closed state.

9. A latch structure for an in-vehicle door, the latch structure comprising:
a door that is changeable between a closed state in which the door covers a door opening provided on a peripheral wall of a vehicle and an opened state in which the door opens the door opening;
a floor panel that constitutes a floor surface of an interior space;
a door-side engaging portion mounted on the door; and
a floor-side engaging portion mounted on the floor panel and engageable with the door-side engaging portion when the door is in the closed state, the floor-side engaging portion includes a fixing member having a position that is fixed with respect to the floor panel, wherein
the door-side engaging portion includes a movable member that is movable between an engaging position in which the movable member engages with the fixing member and a disengaging position in which the movable member disengages with the fixing member;
one of the fixing member and the movable member includes an engaging recessed portion or an engaging hole, and the other includes an engaging protruded portion to be inserted into the engaging recessed portion or the engaging hole;

a recess or an accommodating recessed portion that is a hole penetrating vertically is provided on an upper surface of the floor panel;
at least a part of the floor-side engaging portion is buried in the accommodating recessed portion; and
a passage groove that is connected to the accommodating recessed portion and that allows the movable member to pass through is provided at a position of the floor panel that overlaps with a movement locus of the movable member.

10. The latch structure according to claim 9, wherein:
the fixing member includes the engaging recessed portion or the engaging hole;
the movable member includes the engaging protruded portion; and
an installation surface on which the fixing member is installed is provided with a discharge hole that penetrates vertically and that allows foreign matter to fall out of the vehicle.

11. The latch structure according to claim 9, wherein:
the floor panel includes a plurality of panel pieces; and
of the plurality of the panel pieces, the panel piece on which the floor-side engaging portion is mounted is independently removable from the vehicle while the other panel pieces remain attached to the vehicle.

12. A vehicle equipped with the latch structure for the in-vehicle door according to claim 9, wherein:
the floor panel includes a sealing surface on a peripheral edge; and
the door includes a sealing member that comes into close contact with the sealing surface and seals a gap between the door and the floor panel in the closed state.

13. The vehicle according to claim 12, further comprising a slope plate that is changeable between a deployed state in which the slope plate extends from a lower end of the door opening toward a road surface, and an accommodated state in which the slope plate is accommodated in an underfloor space below the floor panel, wherein:
the door is set to a position and size that secures a movement path of the slope plate when the door is in the closed state and the slope plate is changed from the accommodated state to the deployed state or from the deployed state to the accommodated state; and
the slope plate is changeable from the accommodated state to the deployed state or from the deployed state to the accommodated state while the door is in the closed state.

14. A vehicle equipped with a latch structure for an in-vehicle door, the latch structure comprising:
a door that is changeable between a closed state in which the door covers a door opening provided on a peripheral wall of a vehicle and an opened state in which the door opens the door opening;
a floor panel that constitutes a floor surface of an interior space;
a door-side engaging portion mounted on the door;
a floor-side engaging portion mounted on the floor panel and engageable with the door-side engaging portion when the door is in the closed state; and
a slope plate that is changeable between a deployed state in which the slope plate extends from a lower end of the door opening toward a road surface, and an accommodated state in which the slope plate is accommodated in an underfloor space below the floor panel, wherein,
the floor panel includes a sealing surface on a peripheral edge;

the door includes a sealing member that comes into close contact with the sealing surface and seals a gap between the door and the floor panel in the closed state;

the door is set to a position and size that secures a movement path of the slope plate when the door is in the closed state and the slope plate is changed from the accommodated state to the deployed state or from the deployed state to the accommodated state; and the slope plate is changeable from the accommodated state to the deployed state or from the deployed state to the accommodated state while the door is in the closed state.

\* \* \* \* \*